Feb. 13, 1973   J. F. KRAKOWSKI   3,715,976
COMMERCIAL FOOD FRYER AND METHOD OF CLEANING
Filed Oct. 18, 1971   2 Sheets-Sheet 1
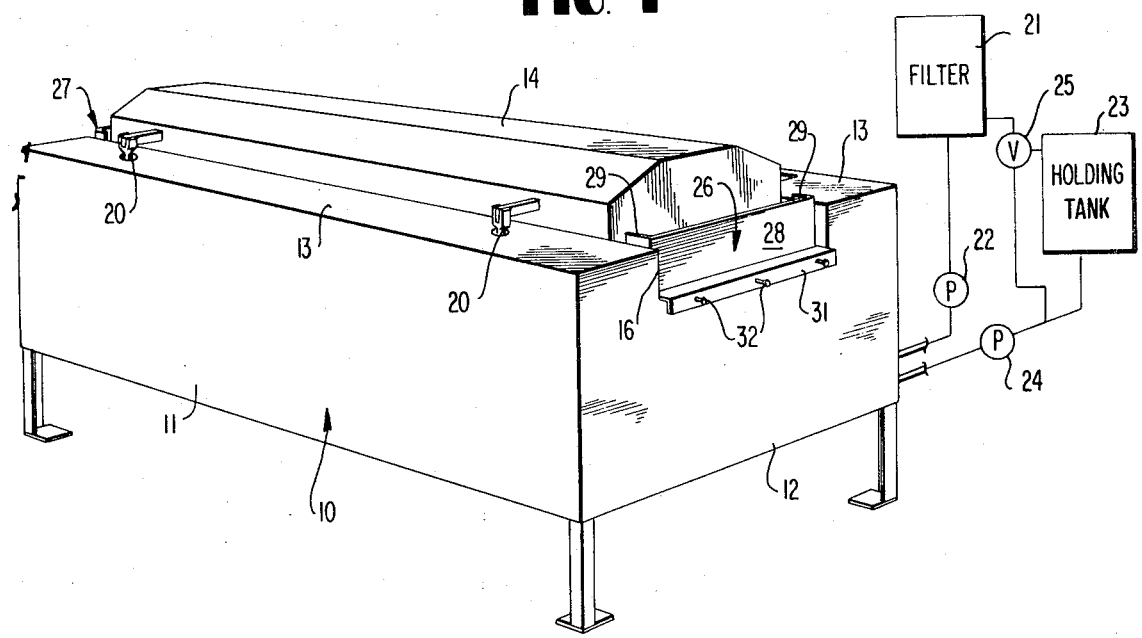
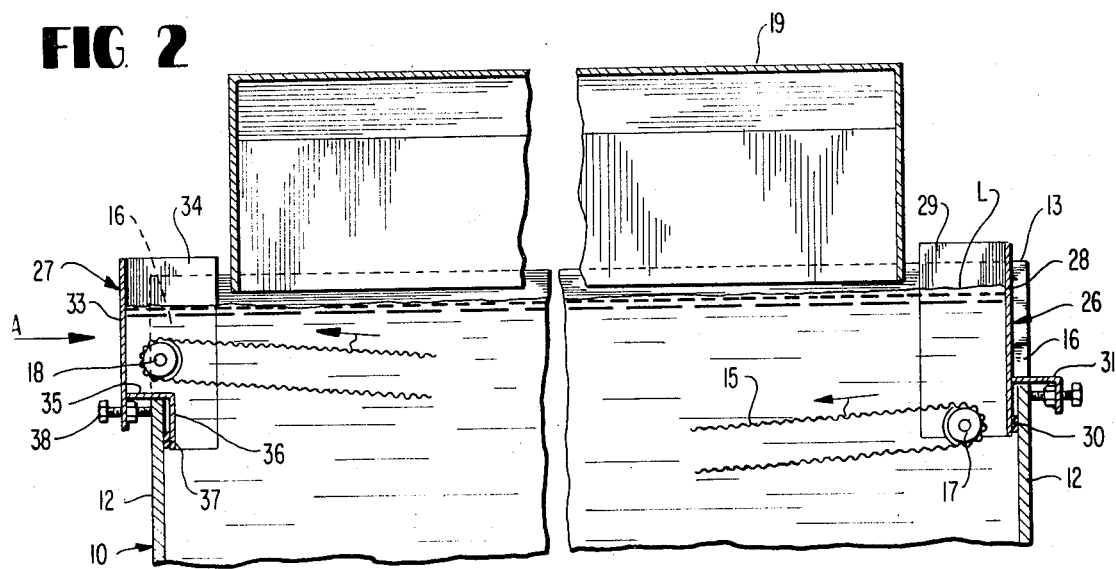
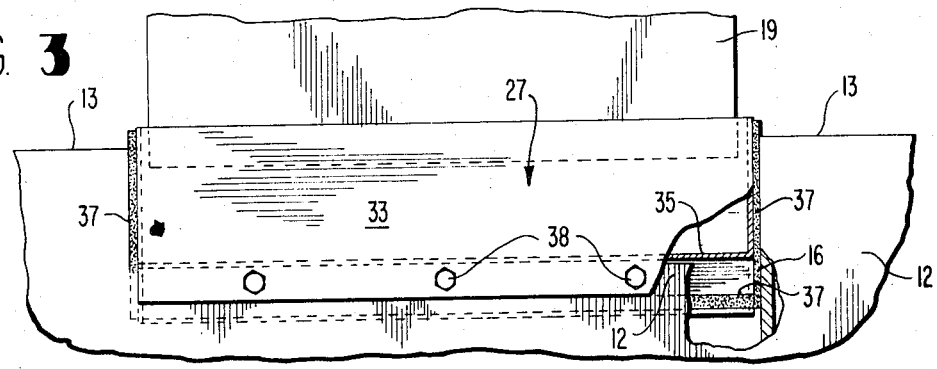

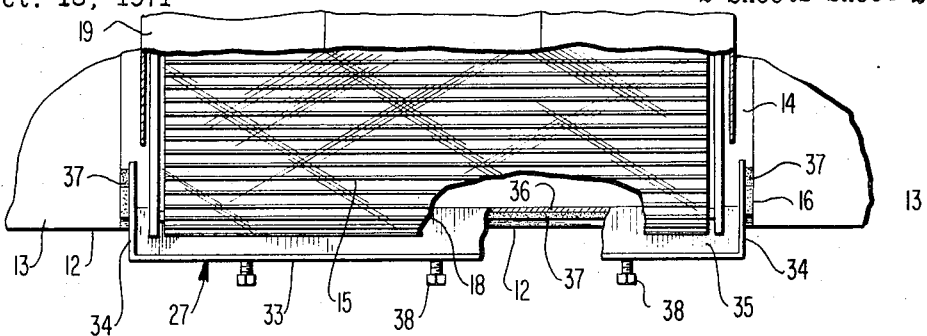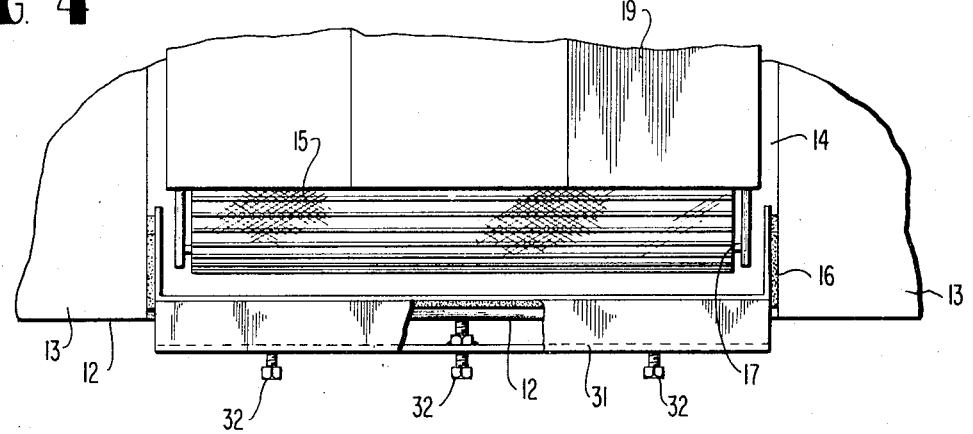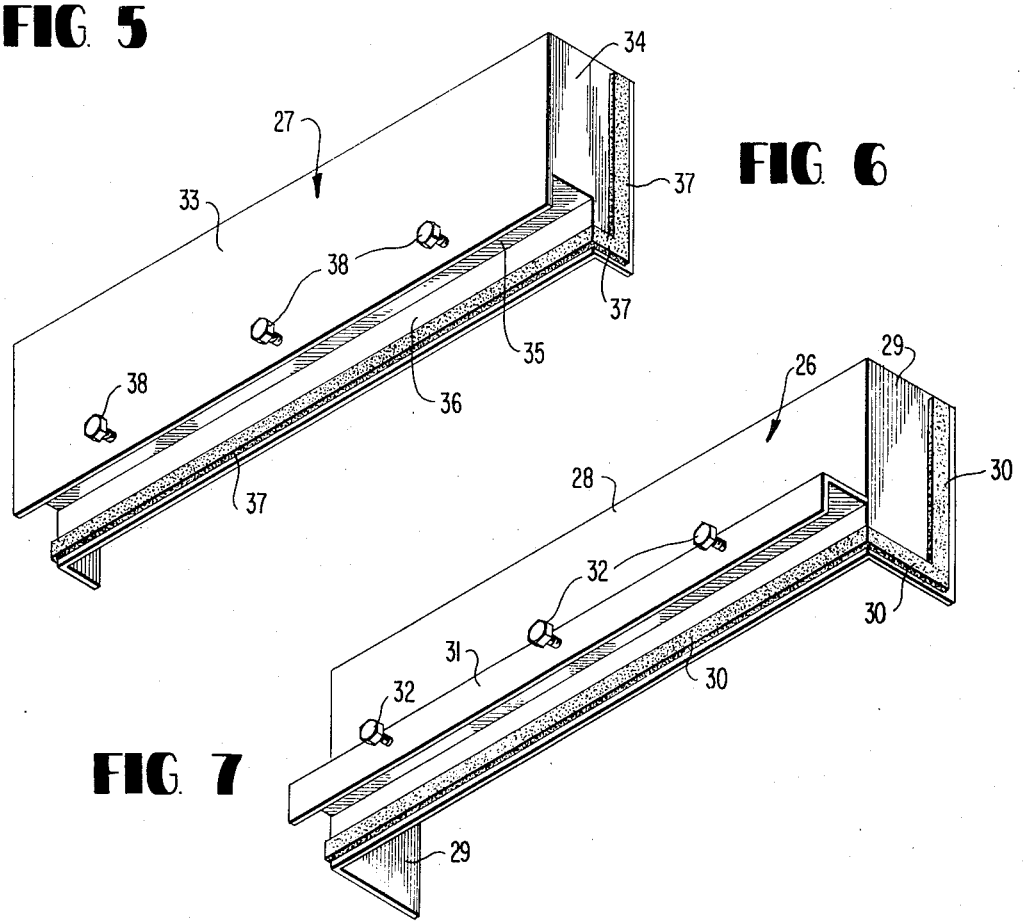

United States Patent Office 3,715,976
Patented Feb. 13, 1973

3,715,976
COMMERCIAL FOOD FRYER AND
METHOD OF CLEANING
John F. Krakowski, Rehoboth Beach, Del., assignor to
Mark 7 Seafood and Industries, Inc., Houston, Del.
Filed Oct. 18, 1971, Ser. No. 190,116
Int. Cl. A47j 37/12
U.S. Cl. 99—404
9 Claims

ABSTRACT OF THE DISCLOSURE

Readily detachable gasketed extension panels are secured to the infeed and discharge ends of a continuous-type fryer for fish or like food products. The extension panels permit flooding of the fryer with cleaning liquid to a level above the food conveyor so that the latter is totally immersed during cleaning and laborious scrubbing and scouring is eliminated.

BACKGROUND OF THE INVENTION

A very difficult problem arises in connection with the periodic cleaning of large commercial fryers for fish and the like. In such fryers, the infeed end of a moving conveyor belt receives pieces of fish from a batter and breading station and conveys the fish through a bath of hot liquid fat until cooking is complete. The deep fat fried fish emerges from the fat bath near the discharge end of the conveyor and from this point, the fried fish is conveyed to a freezer station customarily. Both the infeed and discharge ends of the upper conveyor in the deep fat fryer at an elevation above the normal level of the liquid fat, the remainder of the long conveyor being submerged in the fat to accomplish the deep fat drying operation. The fryer is a long apparatus, up to twenty feet more-or-less, and trough like opening exists at each end of the fryer adjacent the ends of the conveyor. The discharge end of the conveyor is actually disposed within one of these end openings and above the adjacent end wall of the fryer vat. The top of the fryer above the conveyor is cvoered by a long hood equipped with power means to raise and lower it. This hood tends to trap smoke and grease during the frying operation.

Because of the disposition of the conveyor relative to the end openings in the fryer, it is very difficult and costly to clean the machine periodically as becomes necessary after periods of operation. The machine including the conveyor is essentially constructed from stainless steel. A great deal of hand scraping, brushing and scouring is usually required to remove cooked-on deposits of grease and batter. It is necessary to shut down the fryer for a long period of time and pump out the fat to an outside holding tank and then laboriously clean the interior of the fryer, including the conveyor. This is a very expensive and wasteful operation and a great need has existed for a long time for a more economical and efficient method of cleaning commercial fish fryers of the type embodied in the invention.

The object of this invention is to satisfy the above need of the art through the provision of simple attachment parts on the existing fryer, the use of which will enable the fryer to be flooded with hot water or other cleaning liquid to a level near the very top of the fryer and completely above the infeed and discharge ends of the endless conveyor. The conveyor can be operated in this flooded environment with the cleaning liquid at an elevated temperature and in the presence of certain caustic cleaning materials. In this way, the interior of the fryer including the conveyor can be thoroughly cleaned in a minimum of time without the necessity for hand-scraping or scouring. Baked-on sediment can be removed from very small crevices of the machine which are virtually impossible to clean by hand. Costly cleaning chemicals are eliminated and a much cleaner machine results without the manual labor customarily required at the present time. The down time for the machine is reduced materially and sanitary requirements are met with much less labor and cost. It is believed that labor cost for cleaning is reduced approximately 75% due to the elimination of hand-scraping. The fryer is essentially self-cleaning by the invention process after the simple extension panels or closures have been mounted so as to block the end openings in the fryer so that complete flooding can take place.

Other features and advantages of the invention will become apparent during the course of the following detailed description.

BRIEF DESCRIPTION OF DRAWING FIGURES

FIG. 1 is a perspective view of a continuous type deep fat fryer embodying the invention, partly diagrammatic.

FIG. 2 is an enlarged fragmentary central vertical longitudinal section through the fryer.

FIG. 3 is an end elevation, partly in section, taken in the direction of the arrow A in FIG. 2.

FIG. 4 is a plan view, partly in section, of the apparatus shown in FIG. 3.

FIG. 5 is a fragmentary plan view of the opposite end of the fryer.

FIG. 6 is a perspective view of a closure panel for one end of the fryer.

FIG. 7 is a perspective view of the closure panel for the opposite end.

DETAILED DESCRIPTION

Referring to the drawings in detail wherein like numerals designate like parts throughout, the numeral 10 designates the tank body or vat of a continuous type deep fat fryer for fish fillets or other like food products. The vat 10 is generally rectangular and elongated, being up to twenty feet or more in length and four to five feet in overall width. The vat includes a closed bottom wall, side and end walls 11 and 12, and partial top walls or ledges 13 along the opposite sides of a central trough-like opening 14 in which a center longitudinal endless belt type food product conveyor 15 operates.

Adjacent the ends of the conveyor 15, the tops of the vat end walls 12 have large rectangular openings 16 formed therethrough to facilitate the infeed and discharge of the fish pieces at the opposite ends of the fryer. As best shown in FIG. 2, the infeed end of the conveyor 15 is formed by a conveyor roll 17, which may be a powered roll or unpowered. The roll 17 is arranged immediately inwardly of and slightly below the adjacent end wall opening 16 to facilitate the placement of fish pieces onto the conveyor 15 as they are delivered from a batter and breader station or the like. The normal level of cooking fat in the vat 10 is considerably below the elevation of the roll 17 and both the infeed and discharge ends of the conveyor run dry and out of the cooking fat.

The product discharge end of the conveyor 15 is defined by another conveyor roll 18 which is located immediately above the adjacent end wall 12 in the end opening 16 of the fryer. Between the two rolls 17 and 18, the stainless steel conveyor element 15 is submerged in the cooking fat throughout a major portion of its length although its two end portions are above the level of the fat, as stated.

The fryer is covered immediately over the conveyor 15 by a long hood 19 whose purpose is to trap smoke and grease. The heavy hood 19 is preferably supported as at 20 on some form of power-operated lifting means, such as extensible and retractable rams, so that the hood can be raised considerably above the top of the vat 10 whenever desired.

The fryer, as indicated diagrammatically in FIG. 1, contains an external filter 21 for the cooking fat, a first pump 22 between the vat and filter, a holding tank 23 for the fat, a second pump 24 between the outside holding tank and the vat, and a valve means 25 between the filter and holding tank. This arrangement is conventional. It provide for a continuous circulation of the fat through a cleaning filter during the normal cooking cycle and it allows the fat periodically to be pumped out of the fryer and into a holding tank as during cleaning of the machine.

Customarily, when it is necessary to clean the fryer, the procedure followed is to pump all of the fat out of the vat 10 and into the holding tank 23 while the interior of the vat and the hood 19 are thoroughly scrubbed and scraped by hand with the aid of suitable cleaners or chemicals. The conveyor 15 must also be cleaned by hand as well as all surrounding corners and crevices. The procedure is very laborious, time-consuming and expensive and requires the shutting down of the machine and interruption of production.

To facilitate flooding the fryer with water or the like up to the approximate level L, FIG. 2, there is provided a pair of similar but non-identical end closure elements or panels 26 and 27 for the respective infeed and discharge ends of the fryer. The purpose of these closure elements is to produce a liquid tight seal around the trough-like end openings 16 so that when the fryer is flooded with water up to the level L, the water will not escape and will completely submerge the conveyor and all other internal components so that the fryer can be made substantially self-cleaning without scrubbing or scraping.

The closure element 26 for the infeed end comprises a main end wall 28 and short side walls 29, all integrally joined into a substantially U-shaped structure, FIG. 7. Gasketing 30 is provided in a continuous strip along the lower edge of the end wall 20 and along the lower edges and rear vertical edges of the side walls 29. A rigid angle bracket 31 is secured to the end wall 28 and carries a plurality of laterally spaced adjustable clamping screws 32 which bear against the adjacent end wall 12 of the vat 10, FIGS. 2 and 5, when the closure 26 is in place on the vat to facilitate cleaning. At this time, the gasketing 30 seals the interior faces of the adjacent end wall 12 and the opening 16 as clearly indicated in FIGS. 2 and 5. Therefore, the water or liquid up to the level L cannot escape from the adjacent end opening 16 during the cleaning cycle.

Similarly, the closure element 27 for the discharge end of the fryer comprises a main end wall 33, side walls 34 and short horizontal and vertical walls 35 and 36 as shown in FIGS. 2 and 6. Gasketing in the form of a continuous strip 37 extends along the edges of the walls 34 and 36, FIG. 6. Clamping screws 38 carried by the lower end portion of the wall 33 engage the outer side of vat end wall 12 to lock the closure 27 in place with the gasketing 37 in sealing contact with the end wall 12 and the side walls of opening 16. The conveyor roll 18 is now effectively beneath the liquid level L in an extension of the tank or vat formed by the closure element 27, FIG. 2. Thus, by the provision of the two simple removable end closures 26 and 27 within the openings 16, the liquid level of the vat may be extended substantially to the top of the vat defined by the ledges 13 without overflowing. This enables the conveyor 15 to be operated while completely submerged.

The method of cleaning the fryer is the following. The cooking oil or fat is pumped out of the fryer vat 10 and into the holding tank 23 and the valving is adjusted for circulation through the filter and fryer. The filter paper is removed from the filter 21 and the two closure elements 26 and 27 are placed on the fryer securely in sealed engagement with the end openings 16. The food product discharge chute, not shown, is first removed.

The fryer and filter are pre-rinsed with hot water at a temperature of 160° F. to 180° F. and drained. The vat 10 is now filled with hot water as indicated by the level L in FIG. 2 and approximately 25 pounds of caustic soda or like cleaning material is added. Next, the fryer is lit and the temperature elevated to 200° F. for two hours while circulating the hot water and caustic cleaner through the fryer and filter. Preferably, the conveyor element 15 is run in the cleaning liquid at this time although this is not absolutely necessary. Because of evaporation, the water level in the fryer may decrease about three inches.

Next, the temperature of the water in the fryer is elevated to 215° F. for about fifteen minutes. The hood 19 is in the down position at this time. The elevated temperature produces a violent boiling action in the vat 10 which removes baked-on sediment from all parts and thoroughly cleans the underside of the hood 19 as well. The attachment closure elements 26 and 27 contain the violently boiling water and the bubbles within the apparatus. Following this, the fryer is drained and the fryer and filter are rinsed with clear warm water at 140° F. to 160° F. and again drained. The system is refilled with warm water and about two cups of phosphoric acid for neutralization. The fryer is again drained and rinsed three times and during the final rinse, the pH of the water is checked to assure that there are no remaining traces of acidity.

By the above procedure, the apparatus essentially cleans itself without the need for scouring or scraping by hand. Labor costs are drastically cut up to 75% and the most stubborn baked-on sediment is removed from surfaces. The many advantages of the invention will be apparent to those skilled in the art without the necessity for further description herein.

It is to be understood that the form of the invention herewith shown and described is to be taken as a preferred example of the same, and that various changes in the shape, size and arrangement of parts may be resorted to, without departing from the spirit of the invention or scope of the subjoined claims.

What is claimed is:

1. In a commercial food dryer of the type having a vat containing a bath of cooking fat and a conveyor for food items running below the level of the cooking fat for at least a portion of its length to accomplish deep frying of the food items, the opposite end portions of the conveyor being above the level of the cooking fat within the fryer, and the fryer having end openings adjacent said end portions of the conveyor through which food items are fed onto the conveyor and discharged therefrom, the improvement which comprises a pair of removable end closure members for the fryer, means carried by the end closure members and being detachably engageable with parts of the fryer to fixedly secure the end closure members thereon adjacent said end openings, and gasketing around the margins of the end closure members sealingly contacting adjacent parts of the fryer surrounding the end openings to prevent the escape of liquid from the fryer through the end openings and allowing the liquid level in the fryer to be elevated substantially above said end portions of the conveyor so that the conveyor may be fully submerged in liquid within the fryer.

2. The structure of claim 1, and said end openings being trough-like openings in the top and end walls of the fryer, the fryer having side walls extending well above the bottoms of the end openings, said end closure members comprising generally U-shaped panels having main end walls spanning the end openings and side walls which engage inwardly of the side faces of the end openings, said gasketing being in continuous strips on the end and side walls of the generally U-shaped panels.

3. The structure of claim 2, and adjustable screw-threaded clamping means on each end closure member for detachably securing it to a structural part of the fryer.

4. The structure of claim 1, and a hood for the fryer extending substantially between said end openings and located above the conveyor and immediately inwardly of the fryer side walls.

5. A method of cleaning a commercial food fryer of a type having an elongated fryer vat containing a bath of cooking fat and a longitudinal food conveyor within the vat at least partially submerged in said bath and having infeed and discharge ends disposed above the level of the bath and adjacent to end openings at the top of the vat through which food items enter the fryer and are discharged therefrom, said method comprising temporarily elevating the liquid bath retaining level of the vat to a point well above said end portions of the conveyor and substantially at the top of the vat by closing the end openings and preventing liquid from flowing therethrough, filling the fryer with a cleaning liquid bath up to said elevated level, and heating the cleaning liquid bath to a degree suitable for effecting the desired internal cleaning of the fryer including the conveyor.

6. The method of claim 5, and operating the conveyor while the conveyor is fully submerged in the cleaning liquid bath.

7. The method of claim 5, and introducing a caustic cleaner to the cleaning liquid bath and violently boiling, followed by draining and rinsing of the vat.

8. The method of claim 5, and said closing of the end openings of the vat effected by the placement of temporary liquid dams in the end openings so that the liquid level of the vat can rise to the top of the vat without spilling through the end openings.

9. The mthod of claim 5, and said food fryer also having a vertically movable hood covering the top thereof adjacent the food conveyor and between the end openings, and the additional steps of lowering said hood into closed relation with the top of the vat during cleaning, and causing the cleaning liquid bath to boil violently beneath the hood to scour the interior of the hood with bubbles.

References Cited

UNITED STATES PATENTS

| | | | |
|---|---|---|---|
| 2,853,937 | 9/1958 | Peck | 99—404 |
| 3,480,021 | 11/1969 | Ewald, Jr. | 134—24 |
| 3,203,341 | 8/1965 | Hedgepeth | 99—404 |
| 3,376,806 | 4/1968 | Magnusson | 99—404 |
| 3,416,166 | 12/1968 | Hanson | 49—466 |
| 3,192,936 | 7/1965 | Devine | 134—183 |

FOREIGN PATENTS

| | | | |
|---|---|---|---|
| 645,126 | 7/1964 | Belgium | 99—404 |

OTHER REFERENCES

T. E. Davis, Multistage Rinse Tank, IBM Technical Disclosure Bulletin, vol. 11, No. 11, April 1969.

LEON G. MACHLIN, Primary Examiner

U.S. Cl. X.R.

49—466; 134—183